(12) United States Patent
Pung et al.

(10) Patent No.: US 11,877,710 B2
(45) Date of Patent: *Jan. 23, 2024

(54) CLEANING IMPLEMENT COMPRISING A MODIFIED OPEN-CELL FOAM

(71) Applicant: The Procter & Gamble Company, Cincinnati, OH (US)

(72) Inventors: David John Pung, Loveland, OH (US); Megan Showell Roberts, Overland Park, KS (US); Johann Martin Szeifert, Mannheim (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/577,585

(22) Filed: Jan. 18, 2022

(65) Prior Publication Data

US 2022/0133119 A1    May 5, 2022

Related U.S. Application Data

(63) Continuation of application No. 15/815,733, filed on Nov. 17, 2017, now Pat. No. 11,259,680.

(60) Provisional application No. 62/425,631, filed on Nov. 23, 2016.

(51) Int. Cl.
| | |
|---|---|
| C08J 9/04 | (2006.01) |
| A47L 13/17 | (2006.01) |
| C08G 12/32 | (2006.01) |
| C11D 11/00 | (2006.01) |
| C11D 17/04 | (2006.01) |
| B32B 5/18 | (2006.01) |
| C08G 8/08 | (2006.01) |
| A47L 13/16 | (2006.01) |
| C08G 12/30 | (2006.01) |

(52) U.S. Cl.
CPC .............. *A47L 13/17* (2013.01); *A47L 13/16* (2013.01); *B32B 5/18* (2013.01); *C08G 8/08* (2013.01); *C08G 12/30* (2013.01); *C08G 12/32* (2013.01); *C08J 9/04* (2013.01); *C11D 11/0023* (2013.01); *C11D 17/049* (2013.01); *C08G 2110/005* (2021.01); *C08J 2201/022* (2013.01); *C08J 2205/08* (2013.01); *C08J 2323/06* (2013.01); *C08J 2361/28* (2013.01)

(58) Field of Classification Search
CPC ....... A47L 13/17; B32B 5/18; B32B 2250/02; B32B 2250/03; B32B 2250/22; B32B 2260/021; B32B 2260/046; B32B 2262/101; B32B 2264/102; B32B 2264/104; B32B 2264/108; B32B 2266/02; B32B 2266/025; B32B 2266/0264; B32B 2266/0278; B32B 2266/0285; B32B 2266/06; B32B 2270/00; B32B 2307/4026; B32B 2307/51; B32B 2307/546; B32B 2307/554; B32B 2307/718; B32B 2307/72; B32B 2307/7265; B32B 2307/728; B32B 2307/73; B32B 2307/732; B32B 2432/00; B32B 5/022; B32B 5/024; B32B 5/245; B32B 5/26; B32B 5/32; B32B 7/08; B32B 7/12; B32B 13/045; B32B 15/046; B32B 21/047; B32B 27/065; B32B 27/32; B32B 27/36; B32B 29/005; B32B 29/007; B32B 29/02; B32B 29/05; C08G 12/32; C08G 2110/005; C08J 9/04; C08J 9/141; C08J 9/40; C08J 2201/022; C08J 2203/14; C08J 2205/05; C08J 2207/00; C08J 2323/06; C08J 2361/28; C11D 11/0023; C11D 17/049; C08F 2800/20

See application file for complete search history.

(56) References Cited

U.S. PATENT DOCUMENTS

| | | | |
|---|---|---|---|
| 11,224,328 B2 | 1/2022 | Pung et al. | |
| 11,259,680 B2 | 3/2022 | Pung et al. | |
| 2007/0157948 A1 | 7/2007 | Gonzales et al. | |
| 2012/0142802 A1 | 6/2012 | Steinke et al. | |
| 2015/0210814 A1 | 7/2015 | Gross et al. | |
| 2018/0140157 A1 | 5/2018 | Pung | |
| 2022/0104679 A1 | 4/2022 | Pung et al. | |

FOREIGN PATENT DOCUMENTS

| | | |
|---|---|---|
| EP | 1808116 A1 | 7/2007 |
| EP | 2202255 A1 | 6/2010 |
| JP | 3170648 U | 8/2011 |
| WO | 2006/103404 A1 | 10/2006 |
| WO | 2007031944 A2 | 3/2007 |
| WO | 2012/158732 A1 | 11/2012 |

OTHER PUBLICATIONS

PCT Search Report and Written Opinion for PCT/US2017/062467 dated Mar. 2, 2018; 15 pages.
All Office Actions, U.S. Appl. No. 15/815,733, filed Nov. 17, 2017.
All Office Actions, U.S. Appl. No. 15/815,732, filed on Nov. 17, 2017.
All Office Actions; U.S. Appl. No. 17/552,562, filed Dec. 16, 2021.

*Primary Examiner* — Irina S Zemel
(74) *Attorney, Agent, or Firm* — Carolyn S. Powell; George H. Leal

(57) ABSTRACT

The present invention relates to a cleaning implement that includes a melamine-formaldehyde foam. The melamine-formaldehyde foam cleaning implement has a d90/d10 ratio above 1.65 and a compression deflection force above 3.25 psi. Additionally the present invention encompasses processes for making and methods for cleaning hard surfaces with a cleaning implement according to the present invention.

20 Claims, 2 Drawing Sheets

CLEANING IMPLEMENT COMPRISING A MODIFIED OPEN-CELL FOAM

TECHNICAL FIELD

The present invention relates to cleaning implement based on melamine-formaldehyde foams. The melamine-formaldehyde foam has a d90/d10 ratio above 1.65 and a compression deflection force above 3.25 psi.

BACKGROUND OF THE INVENTION

Recently, a novel application for such melamine-formaldehyde foams in the area of hard surface cleaning has been discovered. Indeed, cleaning implements of cut or molded pieces of such melamine-formaldehyde foam, and in particular melamine foam, have become popular to remove soils and/or stains from hard surfaces (i.e., cleaning of hard surfaces) such as tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on. Indeed, melamine foam sponges are currently marketed under the tradename Mr. Clean Magic Eraser®.

It is has been observed that melamine-formaldehyde foam in particular shows good soil and/or stain removal performance when used to clean hard surfaces, on stains/soils such as marks on walls and furniture. Indeed, it has been observed that melamine foam in particular, when wetted with an appropriate solvent, such as tap water, removes soils and/or stains from a hard surface when said hard surface is brought into contact with said wetted modified open-cell foam. By "bringing into contact" it is meant wiping, swiping, rubbing or the like. In order for the melamine foam in particular to optimally remove soils and/or stains from hard surfaces substantial amounts of an appropriate solvent, such as tap water, have to be used. Most commonly, tap water is used by the users of melamine foam when removing soils and/or stains from hard surfaces. When used with water or any other appropriate solvent, the melamine foam in particular comes off as small particles (meaning, the foam crumbles) when brought into contact with a hard surface. Indeed, a milky suspension of small modified melamine foam in particular particles in water is formed. However there has been the need for better soil and/or stain removal with better durability upon use.

It is therefore, an objective of the present invention to provide a cleaning implement, wherein said implement is capable of (improved) cleaning greasy soap scum soils and neat kitchen dirt (grease) from hard surfaces whilst providing a good surface safety profile and at the same time showing excellent durability upon use.

It has been now found that above objective can be met by use of cleaning implement that includes a melamine-formaldehyde foam that comprises at least one linear polymer. Indeed, the objectives are met by cleaning implements according to present invention based on such melamine-formaldehyde foam, the method of cleaning hard surfaces with such a cleaning implement or the method of cleaning hard surfaces with the melamine-formaldehyde foams according to present invention.

The articles, processes and uses according to the present invention will now be described.

SUMMARY OF THE INVENTION

The present invention relates to a cleaning implement that includes a melamine-formaldehyde foam. The melamine-formaldehyde foam has a d90/d10 ratio above 1.65 and a compression deflection force above 3.25 psi.

The present invention further encompasses processes for making and methods for cleaning hard surfaces with a cleaning implement according to the present invention.

DETAILED DESCRIPTION OF THE INVENTION

Cleaning Implement

Figure 1:
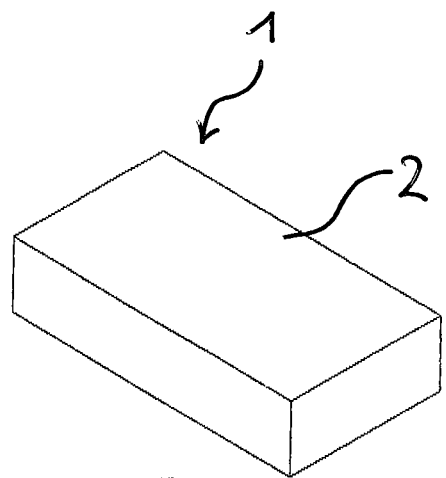
FIG. 1 is a perspective view of a cleaning implement 1.

The cleaning implement 1 herein is based on the melamine-formaldehyde foam comprising at least one liner polymer.

By a "cleaning implement" it is meant herein an article of manufacture of any suitable shape and/or size and/or volume suitable for cleaning, i.e., removing spots and/or stains from hard surfaces. In a highly preferred embodiment according to the present invention, the cleaning implement herein is in a shape and/or size and/or volume suitable for use by a consumer to clean hard surfaces therewith. Examples of cleaning implements are wipers, brushes, cleaning cloths or cleaning granules.

In a preferred embodiment, the cleaning implements herein are suitable for cleaning/cleansing inanimate surfaces selected from the group consisting of household hard surfaces; dish surfaces; surfaces like leather or synthetic leather; and automotive vehicles surfaces.

In a highly preferred embodiment, the cleaning implements herein are suitable to clean household hard surfaces.

By "household hard surface", it is meant herein any kind of surface typically found in and around houses like kitchens, bathrooms, e.g., floors, walls, tiles, windows, cupboards, sinks, showers, shower plastified curtains, wash basins, WCs, fixtures and fittings and the like made of different materials like ceramic, vinyl, no-wax vinyl, linoleum, melamine, glass, Inox®, Formica®, any plastics, plastified wood, metal or any painted or varnished or sealed surface and the like. Household hard surfaces also include household appliances including, but not limited to: refrigerators, freezers, washing machines, automatic dryers, ovens, microwave ovens, dishwashers and so on. Such hard surfaces may be found both in private households as well as in commercial, institutional and industrial environments.

Suitable shapes of the cleaning implements 1, such as a wiper, herein may be selected from the group consisting of: cube shape, rectangular shape, pyramid shape, cylindrical shape, cone shape, pencil eraser shape, cuboid shape, tetrahedron shape; sphere shape; globular shape; and ellipsoid shape. Preferably, said cleaning implement has a shape selected from the group consisting of: cube shape, rectangular shape, pencil eraser shape, and cuboid shape.

Suitable volumes of the cleaning implements herein may be from 1 cm$^3$ to 10,000 cm$^3$, preferably from 10 cm$^3$ to 1,000 cm$^3$, more preferably from 90 cm$^3$ to 250 cm$^3$.

In a highly preferred embodiment herein, the cleaning implement 1 herein has a cuboid shape defined by three groups of parallel and equal length sides, referred to as a, b and c, wherein a ranges from 2 cm to 20 cm, preferably 4 cm to 8 cm, b ranges from 2 cm to 20 cm preferably 8 cm to 15 cm, and c ranges from 1.5 cm to 5 cm, preferably 2 cm to 4 cm.

The cleaning implement 1 of a first embodiment of the present invention as shown in FIG. 1 comprises a single layer 2 of melamine-formaldehyde foam comprising at least one linear polymer.

In a preferred embodiment according to the present invention the cleaning implements herein may comprise additional layers of material. Preferably, in the cleaning implement herein said melamine-formaldehyde foam 2 comprising at least one linear polymer forms a first layer and said cleaning implement additionally comprises a second layer of material. Even more preferably, said second layer of material is a second foam layer 3 made of a second foam material as discussed herein below. Such a cleaning implement according to this preferred embodiment is shown in FIG. 2.

The layers of melamine-formaldehyde foam 2 comprising at least one linear polymer and second foam 3 may be arranged in said cleaning implement in any way suitable. In a preferred embodiment according to present invention the layers of melamine-formaldehyde foam 2 comprising at least one linear polymer and second foam 3 are arranged parallel to at least one side, preferably two opposite sides, of the cleaning implement. However, the cleaning implement may also have an irregular shape. Indeed, the thickness of the layers may be constant or vary throughout the cleaning implement. The separation line 4 between the two layers may form a straight line or may form a bend or be completely irregular. In addition, the separation plane of the layers may be in the center of cleaning implement, dividing the implement in two equal parts, or may be in the upper or lower part of the implement. In addition, the cleaning implement may be in the shape of a sphere or a globule or an ellipsoid with the separation plane of the layers forming a spherical segment or one of the layers, preferably the layer of a second foam here, forming a sphere in a sphere (similar to the layers of an onion).

Figure 2:
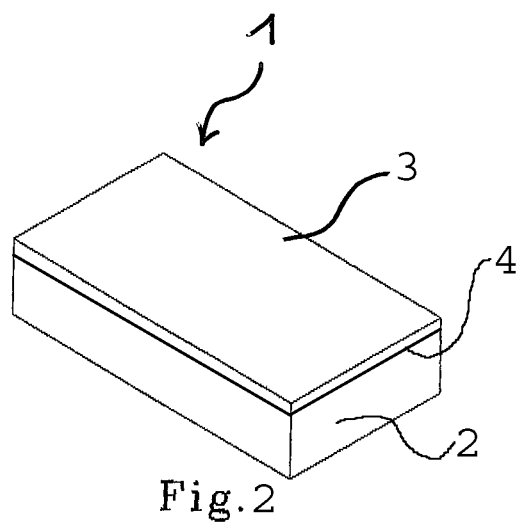
FIG. 2 is a perspective view of a cleaning implement 1 comprising two layers.

In this highly preferred embodiment of the present invention, wherein the cleaning implement 1 herein has a cuboid shape, the line indicating the separation 4 of the two layers (or the surface areas where the two layers are joined together) of the implement is preferably substantially parallel (preferably parallel) to the side of the cuboid shaped implement having the largest surface area (as shown in FIG. 2).

In another highly preferred embodiment herein the cleaning implement herein is in the shape of a pencil eraser. By "shape of a pencil eraser" it is meant herein a voluminous body having six walls, wherein three pairs of parallel and equally shaped and sized walls exist and wherein one pair of walls are in the shape of a parallelogram and the remaining two pairs of walls are of rectangular shape. In this preferred embodiment, wherein the cleaning implement herein has the shape of a pencil eraser, the line indicating the separation of the two layers (or the surface areas where the two layers are joined together) of the implement is preferably substantially parallel (preferably parallel) to the side of implement in the shape of a pencil eraser having the largest surface area.

In order to obtain suitable cleaning implements according to a preferred embodiment of the present invention, the melamine-formaldehyde foam layer 2 comprising at least one linear polymer and the second layer of second foam 3 have to be attached to each other. This attachment can be achieved by any attachment means suitable for joining the two layers. The attachment may be either a permanent attachment (wherein the two layers cannot be separated without inflicting substantial damage to the layers) or temporary attachment (wherein the two layers may be separated without inflicting substantial damage to the layers). Suitable attachment means providing a permanent attachment are selected from the group consisting of: foam flame laminating the two layers together; use of a permanent adhesive; sewing the two layers together; and needle-punching the two layers together; and combinations thereof. Suitable attachment means providing a temporary attachment are selected from the group consisting of: a weak adhesive; Velcro; and a water-based, water-soluble coating or adhesive; and combinations thereof.

In a preferred embodiment here, the attachment of layers herein is a permanent attachment.

Foam flame lamination is a continuous process that can adhere foams and additional materials, if any, to one or both sides of foam in a single pass. The process of flame lamination involves the passing of first foam (either the melamine-formaldehyde foam comprising linear polymer herein or the second foam herein) over an open flame, which creates a thin layer of molten foam/polymer. Second foam (either the second foam herein or the melamine-formaldehyde foam linear polymer herein, depending on the first step) is pressed against the first foam while it is still in the molten state. Foams and additional material, if any, can be adhered to one or both sides of the foam in a single pass. Furthermore, additional passes are optional. The strength of the bond depends upon the foams and additional material, if any, selected and the processing conditions (i.e., gas type, flame height and spread, foam burn-off and nip pressure).

The cleaning implement according to the present invention may contain more than two layers, wherein said additional layers, if any, may be of the same or similar materials as the melamine-formaldehyde foam comprising at least one linear polymer or said second foam, or may be made of another material having similar properties as said second foam or different properties therefore. Indeed, the cleaning implement herein may be in a so-called sandwich configuration, wherein three layers are present. In a preferred embodiment, wherein the cleaning implement herein is in a sandwich configuration, the middle layer may be said second foam and at least one of the two outer layers is melamine-formaldehyde foam comprising at least one linear polymer with the second outer layer being either melamine-formaldehyde foam comprising at least one linear polymer or another material providing other feature, such as abrasiveness or increased rigidity. In a highly preferred embodiment according to the present invention the cleaning implement herein comprises two outer layers of said melamine-formaldehyde foam comprising at least one linear polymer and an inner layer, preferably of a second foam material, as discussed herein below.

The layers of the cleaning implement according to the present invention may cover each other either partially or fully. By a "partial coverage" it is meant that at least one of the layers overlaps the other layer (or other layers, if any) and is not fully covered by said other layer (or other layers, if any). By a "full coverage" it is meant that the layers of the cleaning implement do fully cover each other and that none of the layers substantially overlap the other layer (or other layers, if any).

The ratio of said melamine-formaldehyde foam comprising at least one linear polymer to said second foam in the cleaning implement according to the present invention is preferably from 20:1 to 1:20 by volume, more preferable from 10:1 to 1:10 by volume, even more preferably 5:1 to 1:1, still more preferably 5:1 to 2:1, and most preferably from 4:1 to 3:1 by volume.

In order to obtain suitable cleaning implements according to the present invention, the melamine-formaldehyde foam comprising at least one linear polymer—and second foam-raw materials may have to be modified in shape and/or size. This modification can be done by any means known to those skilled in the art. Suitable means of modifying the shape and/or size of melamine foam- and second foam-raw materials may be selected from the group consisting of: cutting, breaking, and tearing, and combinations thereof.

Melamine-formaldehyde foams as such and their production and also linear polymers as such and their production are known to a person skilled in the art and described in the literature.

The melamine-formaldehyde foams of the present invention comprise at least one linear polymer. The at least one linear polymer preferably has an average number molecular weight $M_n$ in the range from 1000 to 8000 g/mol. Most preferably the linear polymer has a number average molecular weight $M_n$ in the range from 3000 to 5000 g/mol. The number average molecular weight $M_n$ can be calculated from the OH number according to DIN 53240. Preferably 0.1 to 5 parts by weight, more preferably 0.3 to 2 parts of the at least one linear polymer is used per 100 parts of melamine-formaldehyde precondensate. Preferably, the linear polymer is hydrophilic. The water solubility of the linear polymer preferably is more than 5% per weight, more preferably more than 10% per weight. Preferably, the linear polymer comprises at least a terminal hydroxyl group. The linear polymer consists preferably of the elements carbon, hydrogen and oxygen. Most preferably, polyethylene glycol is used as the linear polymer.

The melamine-formaldehyde foams of the present invention comprising at least one linear polymer are preferably obtainable by the consecutive process steps a) and b):

a) heating to foam up and crosslink a mixture comprising a melamine-formaldehyde precondensate having a molar ratio of melamine:formaldehyde in the range of typically from 1:1.3 to 1:5 and preferably from 1:2.5 to 1:3.5, at least one linear polymer, a curative, a dispersant and a blowing agent, and b) drying the foam obtained in process step a), wherein these process steps and also the melamine-formaldehyde precondensates, curatives, dispersants and blowing agents useful in step a) are known in principle to a person skilled in the art and are described in the literature.

The melamine-formaldehyde precondensate in addition to melamine and formaldehyde may comprise up to 50% by weight and preferably up to 20% by weight (all based on the weight of cocondensed melamine) of other thermoset-formers and up to 50% by weight and preferably up to 20% by weight (all based on the weight of cocondensed formaldehyde) of other aldehydes in cocondensed form. Useful thermoset-formers include for example: alkyl- and arylalkyl-substituted melamine, urea, urethanes, carboxamides, dicyandiamide, guanidine, sulfurylamide, sulfonamides, aliphatic amines, glycols, phenol and its derivatives. Examples of useful other aldehydes are acetaldehyde, trimethylolacetaldehyde, acrolein, benzaldehyde, furfurol, glyoxal, gluteraldehyde, phthalaldehyde and terephthalaldehyde. Particular preference is given to an unmodified melamine-formaldehyde precondensate, i.e., a melamine-formaldehyde precondensate devoid of any other thermoset-formers or other aldehydes. Further details concerning melamine-formaldehyde condensation products may be found in Houben-Weyl, Methoden der organischen Chemie, volume 14/2, 1963, pages 319 to 402.

Commercially available melamine-formaldehyde precondensates are useful for a multiplicity of fields of use, for example for further processing into glues. Melamine-formaldehyde precondensates comprising sulfite groups are advantageous for use in some of these fields. Such sulfite group-containing melamine-formaldehyde precondensates are obtainable for example as described in EP-B 37470 whereby from 1% to 20% by weight of sodium disulfite is incorporated in the course of the condensation of melamine and formaldehyde to obtain cocondensed sulfite groups.

For the processes of the present invention, however, it is advantageous that step a) utilizes a precondensate which is free of the sulfite groups.

Emulsification of the blowing agent and stabilization of the foam in step a) requires the addition of a dispersant, e.g., an emulsifier or emulsifier mixture. Useful emulsifiers include anionic, cationic and nonionic surfactants and also mixtures thereof.

Suitable anionic surfactants are diphenylene oxide sulfonates, alkane- and alkylbenzenesulfonates, alkylnaphthalenesulfonates, olefinsulfonates, alkyl ether sulfonates, fatty alcohol sulfates, ether sulfates, alpha-sulfo fatty acid esters, acylaminoalkanesulfonates, acyl isethionates, alkyl ether carboxylates, N-acylsarcosinates, alkyl and alkyl ether phosphates. Useful nonionic surfactants include alkylphenol polyglycol ethers, fatty alcohol polyglycol ethers, fatty acid polyglycol ethers, fatty acid alkanolamides, EO-PO block copolymers, amine oxides, glycerol fatty acid esters, sorbitan esters and alkylpolyglucosides. Useful cationic emulsifiers include alkyltriammonium salts, alkylbenzyldimethylammonium salts and alkylpyridinium salts. The emulsifiers are preferably added in amounts of 0.2% to 5% by weight, based on the melamine-formaldehyde precondensate.

For the melamine-formaldehyde precondensate, which is preferably used in the form of an aqueous solution or dispersion, to produce foam in step a), it has to comprise a blowing agent, the amount depending on the desired density of the foam. In principle, the process of the present invention can utilize both physical blowing agents and chemical blowing agents. Useful physical blowing agents include, for example, hydrocarbons, halogenated and more particularly fluorinated hydrocarbons, alcohols, ethers, ketones and esters in liquid form or air and $CO_2$ as gases. Useful chemical blowing agents include, for example, isocyanates mixed with water, in which case $CO_2$ is released as an effective blowing agent, moreover carbonates and bicarbonates mixed with acids, which likewise produce $CO_2$, and also azo compounds, such as azodicarbonamide. In one preferred embodiment of the present invention, the aqueous solution or dispersion of the melamine-formaldehyde precondensate is admixed with between 1% and 40% by weight, based on the melamine-formaldehyde precondensate, of a physical blowing agent having a boiling point of between 0 and 80° C.; in the case of pentane, the amount used is preferably in the range from 5% to 15% by weight.

Curatives used in step a) comprise acidic compounds catalyzing the continued condensation of the melamine-formaldehyde precondensate. The amounts are between 0.01% and 20% by weight and preferably between 0.05% and 5% by weight, based on the melamine-formaldehyde precondensate. Organic and inorganic acids can be used, examples being hydrochloric acid, sulfuric acid, phosphoric acid, nitric acid, formic acid, acetic acid, oxalic acid, toluenesulfonic acids, amidosulfonic acids and also acid anhydrides.

The aqueous solution or dispersion of the melamine-formaldehyde precondensate used in step a) is preferably free of further added substances. However, it can be beneficial for some purposes to add up to 20% by weight, and preferably less than 10% by weight, based on the melamine-formaldehyde precondensate, of customary added substances, such as dyes, flame retardants, UV stabilizers, agents to lower combustion gas toxicity or to promote carbonization. Since the foams are generally open celled and capable of imbibing water, some applications make it necessary to add hydrophobicizers in amounts of 0.2% to 5% by weight. Useful hydrophobicizers include for example silicones, paraffins, silicone surfactants, fluorosurfactants, hydrophobic hydrocarbonaceous surfactants, silicone emulsions and fluorocarbon emulsions.

The concentration of the melamine-formaldehyde precondensate in the mixture of precondensate and solvent/dispersant, more particularly water, can vary within wide limits between 55% and 85% by weight and preferably between 63% and 80% by weight, all based on the total weight of melamine-formaldehyde precondensate and solvent/dispersant. The preferred viscosity of the mixture of precondensate and solvent/dispersant is between 1 and 3000 dPa·s and preferably between 5 and 2000 dPa·s.

Further mixture components may be mixed with the aqueous solution or dispersion of the melamine-formaldehyde precondensate to form a homogeneous mixture, with the blowing agent being forced in under pressure if necessary. However, it is also possible to start with a solid, for example spray-dried, melamine-formaldehyde precondensate and to subsequently mix it with a dispersion of the linear polymer and/or with an aqueous solution of the emulsifier, with the curative and also with the blowing agent. After mixing, the heated resin mixture with the dispersed blowing agent is discharged through a die and foams up thereafter.

Foaming of the blowing agent-containing solution or dispersion upon emergence from the die is augmented—as described in EP-B 17671—by means of hot air or high frequency irradiation. Preferably, the energy can be input by electromagnetic radiation, for example by high frequency irradiation with 5 to 400 kW, preferably 5 to 200 kW, particularly preferably 9 to 120 kW per one kilogram of the mixture used in a frequency range of 0.2 to 100 GHz, preferably 0.5 to 10 GHz. Magnetrons are a suitable source of radiation for dielectric radiation, with one or more magnetrons being able to be irradiated at the same time.

The mixture to be foamed is irradiated immediately on emerging from the foaming die. The blowing agent evaporates the resin mixture foams up and at the same time cures through.

The foams produced are finally dried to remove water and blowing agent remaining in the foam.

In a further embodiment of the process according to the present invention, process step b) may be followed by a process step c) in which the dried foam is press molded to make it elastic.

Process step c) is known in principle to a person skilled in the art and is described in the literature, for example in EP-A 1 505 105 and EP-B 37470.

The foam blocks or sheets obtained can optionally be thermocompressed in a further process step. Thermocompression as such is known to a person skilled in the art and described for example in WO 2007/031944, EP-A 451 535, EP-A 111 860 and U.S. Pat. No. 6,608,118.

In a preferred embodiment the process comprises the steps of:
a) producing an aqueous mixture M comprising
   100 parts by weight of at least one melamine-formaldehyde precondensate,
   2 to 4 parts by weight, preferably 2.2 to 3.8 parts by weight and more preferably 2.7 to 3.3 parts of at least one curative,
   0.2 to 5 parts by weight, preferably 0.5 to 3 parts by weight and more preferably 1.25 to 2.3 parts by weight of a surfactant mixture,
   0.1 to 5 parts by weight, preferably 0.5 to 4 parts by weight and more preferably 1.1 to 3.6 parts by weight of at least one salt of an inorganic acid and/or of an organic carboxylic acid,
   1 to 40 parts by weight, preferably 10 to 35 parts by weight and more preferably 15 to 21 parts of at least one blowing agent,
   0.1 to 5 parts by weight, preferably 0.3 to 2 parts off at least one linear, polymer with an average molecular weight (number average) $M_n$ in the range from 500 to 10.000 g/mol, preferably in the range from 3000 to 5.000 g/mol.
   25 to 60 parts by weight, preferably 30 to 50 parts by weight and more preferably 36 to 44 parts of water,
b) heating and foaming said mixture M using microwave radiation,
c) annealing the foam using hot air and/or nitrogen in a temperature range from 150° C. to 290° C., In general, the melamine-formaldehyde foams according to the present invention have a density of 3 to 100 kg/m³, preferably 5 to 50 kg/m³, more preferably 8 to 12 kg/m³.

Figure 3:
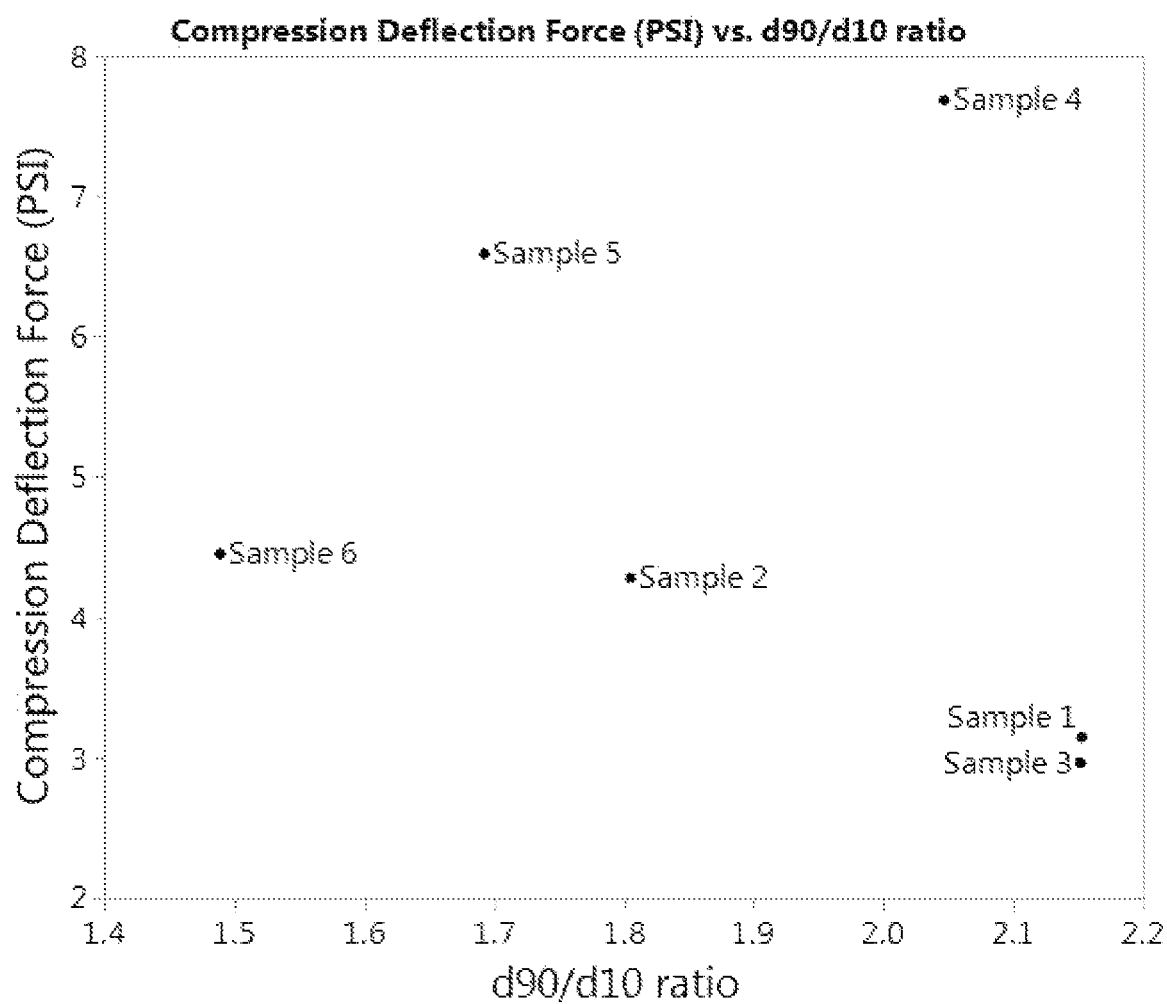
FIG. 3 is a graphical representation of compression deflection force versus d90/d10 ratio of the cleaning implement of the claimed invention and various commercially available implements.

As shown in FIG. 3's graphical representation of compression deflection force versus d90/d10 ratio, the melamine-formaldehyde foam of the claimed invention (Sample 4) provide increased robustness as compared to various commercially available and other implements (Samples 1, 2, 3, 5 and 6). Specifically, the melamine-formaldehyde foam of the present invention preferably have a d90/d10 ratio above 1.65, more probably above 1.7 and most preferably above 1.8 and preferably have a compression deflection force above 3.25 psi, more probably above 3.75 psi and most preferably above 4.25 psi.

According to the present invention the melamine-formaldehyde foams comprising linear polymer are obtainable batch wise or preferably continuously as sheets or webs generally in any desired thickness, advantageously in layered thicknesses ranging from 0.1 to 500 cm, preferably from 0.5 to 200 cm, more preferably from 1 to 100 cm, more particularly from 3 to 80 cm and most preferably from 5 to 50 cm. Moldings comprising melamine-formaldehyde foams according to the present invention are obtainable in a continuous manner or preferably in a batch wise manner.

The melamine-formaldehyde foams in the form of webs, sheets, moldings or some other form can be laminated or endowed with surface layers by generally customary methods on one, two, more or all sides, for example with paper, paper board, glass overlay mat, wood, plaster board, metal sheet or metal foil, plastic or self-supporting plastics foam/sheet which may optionally also be foamed. The surface layers can be applied in the course of foaming or subsequently. In the case of subsequent application, it is advantageous to use an adhesion promoter.

The cleaning implement based on melamine-formaldehyde foams comprising at least one linear polymer are used for cleaning hard surfaces.

Second Layer

In a highly preferred embodiment, as discussed above, the cleaning implement 1 herein may comprises (at least) one additional layer 3. The second layer 3 may comprise a foam, a film, a synthetic nonwoven, a cellulosic sheet, sustainable sheets and combinations thereof. Plural layers may comprise one or more of these materials and laminates thereof, including the same and/or different materials.

If a foam is selected for one or more of the layers, suitable foams are selected from the group consisting of polyurethane foams; polypropylene foams; polyethylene foams; cellulose foam sponges; naturally occurring sponges; open-cell polyester foams; and cross-linked polyethylene foams; and combinations thereof.

If a film is selected for one or more of the layers, the layer may comprise a polyolefinic sheet, as is known in the art. The sheet may comprise polyethylene terephthalate, polypropylene, polyethylene naphthalate, low-density polyethylene, high-density polyethylene, etc. as are known in the art. The film layer may be smooth or textured, as described in commonly assigned U.S. Pat. No. 4,846,821. A film layer may have a basis weight of about 15 to about 60 gsm and/or a thickness ranging from about 0.01 to about 3 mm.

A synthetic nonwoven may be carded, thermally bonded, spunbonded, hydroentagled, etc., as are known in the art. The nonwoven may be of constant or variable basis weight and/or density. The nonwoven may be textured and/or comprise discrete apertures, as disclosed in commonly assigned U.S. Pat. No. 6,936,330. A nonwoven layer may have a basis weight of about 15 to about 120 gsm and/or a thickness ranging from about 0.01 to 3 mm.

A cellulosic sheet may be wet laid and comprise permanent and/or temporary wet strength resins, as are known in the art. The cellulosic sheet may comprise kraft grade or tissue grade paper. The cellulosic sheet may be of constant or variable basis weight and/or density, as disclosed in commonly assigned U.S. Pat. No. 5,277,761 or commonly assigned U.S. Pat. No. 4,637,859. A tissue grade cellulosic sheet may have a basis weight of about 15 to about 45 gsm and/or a thickness ranging from about 0.01 to about 3 mm.

If desired, the one or more of the layers may be made of sustainable materials and/or combinations and blends of sustainable and other materials, including polymers derived from Biorenewable materials. Sustainable materials may include polylactic acid (PLA), polyglycolic acid (PGA), polybutylene succinate (PBS), an aliphatic-aromatic copolyester optionally with high terephthalic acid content, an aromatic copolyester optionally with high terephthalic acid content, polyhydroxyalkanoate (PHA), thermoplastic starch (TPS) and mixtures thereof. Suitable materials are disclosed in commonly assigned U.S. Pat. No. 8,083,064.

If desired, the layer may comprise a laminate of two or more materials. For example, the second layer 3 may comprise a layer of polyolefinic film. This layer may be reinforced with a woven layer or yarn layer attached thereto. A woven layer may comprise a loose weave, providing loop material suitable for attachment to a hook surface. A yarn layer may comprise plural parallel or randomly laid yards, also providing loop material suitable for attachment to a hook surface. The woven and/or yarn layers may be thermally bonded to the second layer 3.

In another embodiment the second layer 3 may comprise any sheet which is flexible, impermeable to fluid and, in one embodiment, hydrophobic. As used herein, the term "impermeable" means that the material resists and, in some embodiments, prevents diffusion of moisture therethrough.

The thickness of said second layer 3, if any, is preferably up to 30 mm, preferably from 0.5 mm to 20 mm, more preferably from 1 mm to 15 mm, even more preferably from 2 mm to 10 mm, and most preferably from 4 mm to 8 mm. Furthermore, in the preferred embodiment herein, wherein the cleaning implement comprises a second layer 3 the thickness of said layer is preferably from 7 mm to 100 mm, more preferably from 15 mm to 25 mm.

In a preferred embodiment herein, the total volume of said second layer 3 in the cleaning implement herein is preferably from 10 $cm^3$ to 100 $cm^3$, more preferably from 20 $cm^3$ to 70 $cm^3$, even more preferably from 30 $cm^3$ to 60 $cm^3$, and most preferably from 40 $cm^3$ to 50 $cm^3$.

Benefit Agent

The cleaning implements herein may contain a benefit agent, located anywhere as known in the art. In one embodiment, the active agent is impregnated in the melamine-formaldehyde foam layer 2 comprising the linear polymer. In another embodiment, the benefit agent is embedded in the second foam layer 3. In yet another embodiment, the benefit agent is impregnated in the attachment means, as discussed above, that attaches the foam layer 2 to the foam layer 3. It will be understood, however, that in still further embodiment that the benefit agent can be located in any or all of the foam layer 2, foam layer 3 or attachment means, as known in the art. Suitable benefit agents are selected among a surfactant, a bleaching agent, a limescale reducing agent, a biocide, a solvent, a polymer, a solid, a colorant and mixtures thereof. In one embodiment, the benefit agent may have an HLB greater than about 5, alternatively greater than about 8 to about 14, alternatively greater than about 12. In another embodiment, the benefit agent may be present in free form in an amount from about 5% to about 20%, or from about 10% to about 15% by weight of the benefit agent. A benefit agent in free form means that the benefit agent is supplied to the cleaning implement in its neat form whose release from the cleaning implement is not purposefully controlled, delayed, or sustained. In some preferred embodiments, the benefit agent(s) is supplied to the cleaning implement in forms, as known in the art, such that the release from the cleaning implement is purposefully controlled, delayed, or sustained.

Surfactants that are suitable for the present invention can be nonionic, anionic, cationic, amphoteric and/or a zwitterionic surfactant. Suitable nonionic surfactants include alkoxylated fatty alcohol having the formula of RO(EO)e (PO)pH, where R is a hydrocarbon chain of from 2 to 24 carbon atoms, EO is ethylene oxide and PO is propylene oxide, e and p respectively representing the average degree of ethoxylation and propoxylation, are independently from 0 to 24, or R is a straight alkyl chain having from 6 to 22 carbon atoms, e is 5-12 and p is 0 (e.g. Lutensol™). Suitable cationic surfactants herein include derivatives of quaternary ammonium, phosphonium, imidazolium and sulfonium compounds. Preferred cationic surfactants herein are trimethyl quaternary ammonium compounds. Suitable amphoteric surfactants herein include amine oxides, betaine or ammonium sulfate or ammonium carboxylate, having the following formula $R_1R_2R_3NO$, $R_1R_2R_3NR_4SO_4$ or $R_1R_2R_3NR_4CO_2$ wherein each of $R_1$, $R_2$ and $R_3$ is independently a saturated substituted or unsubstituted, linear or branched alkyl groups of from 1 to 30, or from 8 to 18 carbon atoms, except for $R_4$ which preferably contain 3 saturated carbons. Preferred amine oxides herein are for instance natural blend $C_8$-$C_{10}$ amine oxides, and $C_{12}$-$C_{16}$ amine oxides, such as cetyl dimethyl amine oxide. Preferred betaine herein is cocamidopropyl betaine and lauramidopropyl betaine. Suitable anionic surfactants include alkyl diphenyl ether sulphonate and alkyl carboxylate. Other suitable anionic surfactants herein include water soluble salts or acids of the formula $ROSO_3M$ wherein R is preferably a $C_{10}$-$C_{24}$ hydrocarbyl, or $C_{12}$-$C_{18}$ alkyl or hydroxyalkyl, and M is H or a cation, such as sodium, potassium, lithium, or ammonium or substituted ammonium. Other suitable anionic surfactants include soap salts, $C_9$-$C_{20}$ linear alkylbenzenesulfonates, $C_5$-$C_{22}$ primary or secondary alkylsulfonates, sulfonated polycarboxylic acids, $C_5$-$C_{24}$ alkylpolyglycolethersulfates (containing up to 10 moles of ethylene oxide); alkyl ester sulfonates, sulfates of alkylpolysaccharides, alkyl polyethoxy carboxylates, such as those of the formula $RO(CH_2CH_2O)_kCH_2COO^{-1}M^+$ wherein R is a $C_8$-$C_{22}$ alkyl, k is an integer from 0 to 10, and M is a soluble salt-forming cation. Resin acids and hydrogenated resin acids are also suitable. Further examples are given in "Surface Active Agents and Detergents" (Vol. I and II by Schwartz, Perry and Berch). A variety of such surfactants are also generally disclosed in U.S. Pat. No. 3,929,678.

Bleaching agents herein may be selected from a hydrogen peroxide source, a preformed peroxycarboxylic acid, a hypohalite bleach source, and a mixture thereof. Hydrogen peroxide sources herein include persulfate, dipersulphate, persulfuric acid, percarbonate, perborate, metal peroxide, perphosphate, persilicate, urea peroxyhydrate and a mixture thereof. Preformed peroxycarboxylic acids herein include those containing one, two or more peroxy groups, and can be aliphatic or aromatic. When the organic percarboxylic acid is aliphatic, the unsubstituted acid suitably has the linear formula: HO—O—C(O)—$(CH_2)_n$—Y, wherein Y is H, $CH_3$, $CH_2Cl$, COOH or C(O)OOH; n is an integer of 1-20. Branched analogs are also acceptable. When the organic percarboxylic acid is aromatic, the unsubstituted acid suitably has formula: HO—O—C(O)—$C_6H_4$—Y wherein Y is hydrogen, alkyl, alkyhalogen, halogen, —COOH or —C(O)OOH. Monoperoxycarboxylic acids useful as oxygen bleach herein are further illustrated by alkyl percarboxylic acids and aryl percarboxylic acids such as peroxybenzoic acid and ring-substituted peroxybenzoic acids, e.g., peroxy-α-naphthoic acid; aliphatic, substituted aliphatic and arylalkyl monoperoxy acids such as peroxylauric acid, peroxystearic acid, and N,N-phthaloylaminoperoxycaproic acid (PAP); and 6-octylamino-6-oxo-peroxyhexanoic acid. Peracids can be used in acid form or any suitable salt with a bleach-stable cation. Suitable hypohalite bleaching agents herein include those that form positive halide ions and/or hypohalite ions, and bleaching agents that are organic based sources of halides, such as chloroisocyanurates. Suitable hypohalite bleaching agents herein include alkali metal and alkaline earth metal hypochlorite, hypobromite, hypoiodite, chlorinated trisodium phosphate dodecahydrate, potassium and sodium dichloroisocyanurates, potassium and sodium trichlorocyanurates, N-chloroimides, N-chloroamides, N-chloroamines and chlorohydantoins.

Limescale reducing agents herein include, but are not limited to, acids and chelating agents. Exemplary acids useful herein include hydrochloric acid, phosphoric acid, sulfuric acid, sulfamic acid, acetic acid, hydroxyacetic acid, citric acid, benzoic acid, tartaric acid, formic acid and mixtures thereof. A mixture of organic and inorganic acid is preferred. Chelating agents useful herein can include, but are not limited to, carboxylates, phosphates, phosphonates, polyfunctionally-substituted aromatic compounds, polyamines, biodegradable compounds, the alkali metal, ammonium or substituted ammonium salts or complexes of these chelating agents, and mixtures thereof. Further examples of suitable chelating agents and levels of use are described in U.S. Pat. Nos. 3,812,044; 4,704,233; 5,292,446; 5,445,747; 5,531,915; 5,545,352; 5,576,282; 5,641,739; 5,703,031; 5,705,464; 5,710,115; 5,710,115; 5,712,242; 5,721,205; 5,728,671; 5,747,440; 5,780,419; 5,879,409; 5,929,010; 5,929,018; 5,958,866; 5,965,514; 5,972,038; 6,172,021; and 6,503,876.

Biocide means any known ingredient having the ability of reducing or even eliminating by killing or removing the micro-organisms existing on a surface, such as those described in U.S. Pat. No. 6,613,728. Biocide useful herein includes a quaternary surface active compound, a guanidine, an alcohol, a glycerol, a phenolic compound, a heavy metal salt, an inorganic and organic acid, a halogen, a halogen-containing compound, a dye, an essential oil, an oxidizing compound, an adsorbent, a fungicide, an algaecide and a mixture thereof. Exemplary quaternary surface active compounds include benzalkonium chloride, benzethonium chloride, cetyl pyridinium chloride, sodium tetradecyl sulfate, sichlorobenzalkonium chloride, methylbenzethonium chloride, cetyl dimethyl ethyl ammonium bromide. Exemplary guanidines include chlorohexidine hydrochloride, chlorohexidine gluconate, dodecylguanidine hydrochloride, polyhexmethylenebiguanidine hydrochloride, and 6-acetoxy-2,4-dimethylmetadioxane. Exemplary alcohols include methanol, ethanol, propanol, isopropanol, etc. Exemplary phenolic compounds include cresol, resolcinols and related compounds, phenol; substituted phenols-cresols, meta-cresylacetate, creosote, quaiacol, resorcinol, hexylresorcinol, pyrogallol, thymol, thymol iodide, picric acid, chlorinated phenols-dichlorophene, hexachlorophene, tars. Exemplary halogens and halogen-containing compounds include iodine and iodoform. Exemplary oxidizing agents include peroxide, sodium perporate, potassium permanganate, zinc permanganate, potassium chlorate. Exemplary heavy metal salts include mercuric chloride, miscellaneous ionizable mercuric salts, organic mercurials, silver nitrate, silver lactate, silver picrate, silver proteins, silver halides, zinc oxide, zinc stearate, copper sulfate and organic tin derivatives. Exemplary dyes include azo dyes, acridene dyes, fluorescein dyes, phenolphthalein dyes and triphenylmethane dyes. Exemplary inorganic and organic acids include hydrochloric acid, sulfuric acid, nitric acid, citric acid, sorbic acid, acetic acid, boric acid, formic acid, maleic acid, adipic acid, lactic acid, malic acid, malonic acid, glycolic acid, and mixtures thereof. Exemplary essential oils are thyme oil, clove oil, cinnamon oil, geranium oil, eucalyptus oil, peppermint oil, citronella oil, ajowan oil, mint oil or mixtures thereof. Other useful biocide herein includes furan derivatives, nitrofurantoin, sulfur, sulfur dioxide, ichthamol, chrysarobin, anthralin, betanaphthol, balsams, volatile oils, chlorophyl.

Biocides useful herein also include fungicides and algaecides which act against molds and mildew. Removal of algae and fungi from hard surfaces is difficult. Moreover, fungi and algae reappear promptly if not completely removed or inhibited. Suitable fungicides and algaecides include metal salts, such as zinc sulfate, zinc acetate, zinc bromide, zinc chloride, zinc iodide, zinc nitrate, zinc bromate and zinc chlorate, cooper halide, copper sulfate, organic tin derivatives, water-insoluble or partially water-soluble fungicides and algaecides, such as diiodomethyl p-tolyl sulfone, N-(trichloromethyl thio) phthalimide, N,N-dimethyl-N-phenyl N'-(fluorodichloromethyl thio) sulphamide, 2-(thiocyanomethylthio) benzothiazole/methylene bis(thiocyanate), 3-iodo-2-propynyl butyl carbamate, etc., all available from ALDRICH chemical. Above biocides are optionally mixed with concentrated acids, such as acetic acid, formic, propionic, n-butanoic, n-pentanoic, trimethylacetic, n-hexanoic, lactic, methoxyacetic, cyanoacetic, chloroacetic, citric, partaric, etc.

The benefit agent may be a solvent having a good dissolving ability for greasy stains. Solvents useful herein include those which are at least partially water-miscible, such as alcohols, ethers, such as diethylene glycol diethylether, diethylene glycol dimethylether, propylene glycol dimethylether, propylene glycol monomethylether, propylene glycol monoethylether, propylene glycol monopropylether, propylene glycol monobutylether, ethylene glycol monobutylether, dipropylene glycol monomethylether, dipropylene glycol monopropyl ether, dipropylene glycol monobutyl ether, diethyleneglycol monobutylether, lower esters of monoalkylethers of ethylene glycol or propylene glycol, such as propylene glycol monomethyl ether acetate, N-methyl pyrolidone and tetrahydrofuran. Mixtures of several solvents can also be used.

Polymers useful herein include polyolefins, polyesters, polyvinyl chlorides, polyamides, mixtures thereof and copolymers thereof. Specific examples of useful polymers include but are not limited to polypropylene, polyethylene, polybutylene, polystyrene, polyethylene terephthalate, polyamide, polyacrylate, polyvinyl chloride, polyvinyl alcohol, ethylene vinyl acetate copolymers and mixtures thereof.

Useful solids include abrasive materials or fillers which may be inorganic or organic materials, e.g. sand, lime ($CaCO_3$), silicates with an average particle diameter (number-average) in the range from about 1 μm to about 1 mm, or colloidal silica, preferably inorganic material are selected from oxides, chlorides, sulfates, phosphates, carbonates of Mg, Mn, Ba, Ca, W, Zr, Ti, Si, Mo, in particular $TiO_2$, $SiO_2$, sand and $Al_2O_3$. Other suitable materials are insoluble sodium polymetaphosphate, hydrated alumina, dicalcium orthophosphate dihydrate, calcium pyrophosphate, tricalcium phosphate, calcium polymetaphosphate. Other abrasive material may be Carbon based materials: i.e.: as referred as black carbon, activated carbon, charcoal, etc. and may be porous or not. Other abrasive material include microspheres. Particularly preferred inorganic fillers are selected from zeolite based materials and silica based materials. Suitable zeolite based materials are described in the following reference texts: ZEOLITE SYNTHESIS, ACS Symposium Series 398, Eds. M. L. Occelli and H. E. Robson (1989) pages 2-7; ZEOLITE MOLECULAR SIEVES, Structure, Chemistry and Use, by D. W. Breck, John Wiley b Sons (1974) pages 245-250, 313-314 and 348-352 (all of which are incorporated herein by reference). $SiO_2$ exists in a variety of crystalline forms and amorphous modifications, any of which are suitable for use herein. In particular, silicas having a high surface area or in agglomerated forms are preferred (i.e., clays or shells). Without being restrictive to a family of silica based materials, commonly silica which is in a highly purified form such that is contains at least about 90%, preferably about 95%, more preferably about 99% silicon dioxide (i.e.: a silica gel having a about 100% silica content, and fumed silica) is preferred. Alternatively, silica based materials may be provided from other sources such as metal silicates including sodium silicate. Further suitable materials are water-insoluble sodium polymetaphosphate, hydrated alumina, dicalcium orthophosphate dihydrate, calcium pyrophosphate, tricalcium phosphate, calcium polymetaphosphate.

Colorants useful herein include as dyes, pigments and mixtures thereof.

Packaging Means

The cleaning implement herein may be combined in an article of manufacture with a packaging means.

The packaging means herein may be any suitable means known to package cleaning implements. Indeed, particularly suitable packaging means herein are selected from the group consisting of: paper bags, plastic bags, cartons, carton boxes, flow wraps, plastic wraps, and paper wraps, and the like and combinations thereof.

The packaging means herein may be printed and/or modified. In particular, such printing and/or other modification may be used to associate a brand-name and/or logo of a hard surface cleaner with said cleaning implement.

Method of Cleaning a Hard Surface

In another embodiment the present invention encompasses method of cleaning a hard surface with a cleaning implement as described herein above.

In yet another embodiment herein, the present invention encompasses a method of cleaning a hard surface by bringing a cleaning implement according to the present invention into contact with said hard surface. By "cleaning" it is meant herein removing spots and/or stains from hard surfaces.

In still another embodiment herein, the present invention encompasses a method of cleaning a hard surface with cleaning implement according to the present invention.

Suitable hard surfaces herein are tiles, walls, floors, sanitary fittings such as sinks, showers, shower curtains, wash basins, WCs, household appliances including, but not limited to, refrigerators, freezers, washing machines, automatic dryers, ovens, microwave ovens, dishwashers and so on.

The methods of cleaning a hard surface according to the present invention may additionally include the step of wetting said cleaning implement or said foam with an appropriate solvent, preferably tap water, more preferably water in combination with a detergent composition, prior to bringing said cleaning implement into contact with said hard surface.

EXAMPLES

Methods of Measurement:
Ram Pressure Value [N]:

All the ram pressure value measurements for assessing the mechanical/resilient properties of the melamine-formaldehyde foams were carried out as follows: A cylindrical steel ram 8 mm in diameter 10 cm in height was pressed at a right angle into a cylindrical foam sample 11 cm in diameter and 5 cm in height until the foam sample broke. The maximum force (unit: N) exerted by the ram until the foam sample broke is hereinafter also referred to as ram pressure value and provides information about the mechanical/resilient quality of the foam. The greater the ram pressure values are, the better the mechanical/resilient properties of the melamine-formaldehyde foams are; the further the values measured on any one melamine-formaldehyde foam parallel and perpendicularly to the direction of rise of the foam differ from each other, the greater the anisotropy is and the worse the homogeneity is of the foam.

Compression Set [%]:

All the compression set value measurements for assessing the elastic properties of wet melamine formaldehyde foams were carried out as follows:

A rectangular foam sample (cut into dimensions: 40 mm×40 mm, height: 25 mm) is soaked in deionized water, and compressed for 60 min between two steel plates (1 cm thickness) to either 20% (5 mm) or 8% (2 mm) of its initial height.

The compression set is determined by the following formula: C=(h0−hi)/h0, where h0 is the initial height before compression and hi is the sample thickness after compression. C0.5 denotes the compression set after 30 min and C24 after 24 hours, respectively.

Compression Deflection Pressure Test Method:

The average Compression Deflection Pressure is determined using the standard method ASTM D3575-14, (approved Jan. 1, 2014), according to the procedures specified in Sections 1-8 and Suffix D (Sections 17-24) with the following modifications: application of the method is extended to additional polymer types including but not limited to melamine formaldehyde; the extent of compression (Sections 17, 22, and 23) is set at 70%; the sample is wetted prior to measurement by placing in a tub of water until eraser is fully submersed then immediately measured without compressing prior to measurement; and the value of the compression deflection force per unit area of specimen in equation 2 of Section 22 and in Section 23 is reported in units of psi. Both the average thickness after pretest pressure and the average compression deflection force as specified in Section 23 are record.

Cumulative Pore Volume Test Method:

The Cumulative Pore Volume Test Method is used to determine the Cumulative Pore Volume $D_{90}/D_{10}$ Ratio. This method makes use of stepped, controlled differential pressure and measurement of associated fluid movement to characterize the distribution of effective pore radii that exist in a material specimen within the range of 10 to 800 μm.

Method Principle

For uniform cylindrical pores, the radius of a pore is related to the differential pressure required to fill or empty the pore by the equation Differential pressure=(2γ cos Θ)/r, where γ=liquid surface tension, Θ=contact angle, and r=pore radius.

Pores contained in natural and manufactured porous materials are often thought of in terms such as voids, holes or conduits, and these pores are generally not perfectly cylindrical nor all uniform. One can nonetheless use the above equation to relate differential pressure to an effective pore radius, and by monitoring liquid movement into or out of the material as a function of differential pressure characterize the effective pore radius distribution in a porous material. (Because nonuniform pores are approximated as uniform by through the use of an effective pore radius, this general methodology may not produce results precisely in agreement with measurements of void dimensions obtained by other methods such as microscopy.)

The Cumulative Pore Volume Method uses the above principle and is reduced to practice using the apparatus and approach described in "Liquid Porosimetry: New Methodology and Applications" by B. Miller and I. Tyomkin published in The Journal of Colloid and Interface Science (1994), volume 162, pages 163-170, incorporated herein by reference. This method relies on measuring the increment of wetting (low-contact-angle) liquid volume that enters or leaves a porous material as the differential air pressure is changed between ambient ("lab") air pressure and a slightly elevated air pressure (positive differential pressure) surrounding the specimen in a sample test chamber. The specimen is introduced to the sample chamber dry, and the sample chamber is controlled at a positive differential pressure (relative to the lab) to prevent fluid uptake into the specimen after the fluid bridge is opened. After opening the fluid bridge, the differential air pressure is decreased in steps (but remains positive), subpopulations of pores acquire liquid according to their effective pore radius. After reaching a minimal (though positive) differential pressure (corresponding to the largest effective pore radius of interest in the specimen) at which the specimen fluid within the fluid is at a maximum, differential pressure is increased stepwise again toward the starting pressure, and the liquid is drained from the specimen. It is during this latter draining sequence (from lowest differential pressure, or largest corresponding effective pore radius, to the largest differential pressure, or smallest corresponding effective pore radius), that cumulative volume distribution is determined in this method. Normalizing to the maximum volume of fluid acquired by the sample (at lowest differential pressure), the cumulative pore volume distribution (as a function of differential pressure, and therefore effective pore radius) is determined by recursively subtracting the incremental volume of liquid drained from the specimen upon each increase in differential pressure step, and this incremental volume is associated with the setpoint of differential pressure (and therefore its effective pore radius) for each particular step.

Sample Conditioning and Specimen Preparation

The Cumulative Pore Volume Method is conducted on samples that have been conditioned in a conditioned room at a temperature of 23° C.±2.0° C. and a relative humidity of 45%±10% for a minimum of 12 hours prior to the test. Except where noted all tests are conducted in such conditioned room, all tests are conducted under the same environmental conditions and in such conditioned room. Any damaged product or samples that have defects such as wrinkles, tears, holes, and similar are not tested. Samples conditioned as described herein are considered dry samples for purposes of this invention. Three specimens are measured for any given material being tested, and the results from those three replicates are averaged to give the final reported value. Each of the three replicate specimens has dimensions of 15 mm×55 mm×55 mm, and the broad surfaces are made parallel and microscopically flat. If no sample available is large enough to create specimens of this size, a smaller specimen may be used with using an acrylic plate (below) sized to maintain the same applied pressure.

One of skill understands that involve several preparation steps, which may include the removal of all cleaning liquid and the separation of the various ply sheets from each other and from other components of the finished article. Furthermore, one of skill understands it is important to ensure the preparation does not damage the ply being tested or alter the measured pore volume characteristics.

Apparatus

Apparatus suitable for this method is described in: "Liquid Porosimetry: New Methodology and Applications" by B. Miller and I. Tyomkin published in The Journal of Colloid and Interface Science (1994), volume 162, pages 163-170. Further, any pressure control scheme capable of controlling the sample chamber pressure between 5 mm $H_2O$ and 1000 mm $H_2O$ differential pressure may be used in place of the pressure-control subsystem described in this reference. One example of suitable overall instrumentation and software is the TRI/Autoporosimeter (Textile Research Institute (TRI)/Princeton Inc. of Princeton, N.J., U.S.A.). The TRI/Autoporosimeter is an automated computer-controlled instrument for measuring pore volume distributions in porous materials (e.g., the volumes of different size pores within the range from 1 to 1000 μm effective pore radii). Computer programs such as Automated Instrument Software Releases 2000.1 or 2003.1/2005.1; or Data Treatment Software Release 2000.1

(available from TRI Princeton Inc.), and spreadsheet programs may be used to capture and analyse the measured data.

Method Procedure

The wetting liquid used is a 0.1% by weight solution of octylphenoxy polyethoxy ethanol (Triton X-100, a non-ionic surfactant available from The Dow Chemical Co., Midland, MI) in distilled water. Liquid density is 1.00 g/cm$^3$, surface tension γ to be 30 mN/m, and the contact angle Θ to be 0° such that cos Θ=1. A 90-mm diameter mixed-cellulose-ester filter membrane with a characteristic pore size of 0.22 μm (such Millipore Corporation of Bedford, MA, Catalog #GSWP09000) is affixed to the porous frit (monel or 316 stainless steel, media grade 80 from Mott Corp., Farmington, CT, or equivalent) of the sample chamber.

A 4 cm×4 cm acrylic plate weighing 32 g is placed on the sample to ensure the sample rests flat on the filter membrane during measurement. No additional weight is placed on the sample.

The sequence of differential pressures that are run in the test, in mm H$_2$O is as follows: 612.6, 306.3, 204.2, 153.2, 122.5, 102.1, 87.5, 76.6, 68.1, 61.3, 51.0, 43.8, 38.3, 34, 30.6, 27.8, 25.5, 23.6, 21.9, 20.4, 17.5, 15.3, 13.6, 12.3, 11.1, 10.2, 9.4, 8.8, 8.2, 7.7, 8.2, 8.8, 9.4, 10.2, 11.1, 12.3, 13.6, 15.3, 17.5, 20.4, 21.9, 23.6, 25.5, 27.8, 30.6, 34, 38.3, 43.8, 51.0, 61.3, 68.1, 76.6, 87.5, 102.1, 122.5, 153.2, 204.2, 306.3, and 612.6. The criterion for moving from one pressure step to the next is that fluid uptake/drainage from the specimen is measured to be less than 15 μL/min.

Determination of Cumulative Pore Volume $D_{90}/D_{10}$ Ratio from Cumulative Pore Volume Distributions The cumulative pore volume distributions (that is, normalized cumulative pore volume as a function of effective pore radius) for the three specimens measured are averaged. $D_{90}$ is defined as the effective pore radius at which the cumulative pore volume distribution function has a value of 0.90. If no measured data point satisfies this, $D_{90}$ is determined by a linear interpolation between the two data points immediately proximal. Similarly, $D_{10}$ is defined as the effective pore radius at which the cumulative pore volume distribution function has a value of 0.10. If no measured data point satisfies this, $D_{10}$ is determined by a linear interpolation between the two data points immediately proximal. The quotient of $D_{90}$ and $D_{10}$ is the Cumulative Pore Volume $D_{90}/D_{10}$ Ratio.

Materials Used:

| | |
|---|---|
| MF | Melamine-formaldehyde precondensate having an average molecular weight (number average) M of 350 g/mol, with a molar ratio of melamine:formaldehyde of 1:3. |
| aS | C12/C14-alkyl sulfate, sodium salt. |
| nS | alkyl polyethylene glycol ether made from a linear, saturated C16/C18 fatty alcohol. |
| E1000 | Pluriol ® E1000 (Polyethylene glycol with an number average molecular weight of 1000) |
| E4000 | Pluriol ® E4000 (Polyethylene glycol with an number average molecular weight of 4000) |
| E6000 | Pluriol ® E6000 (Polyethylene glycol with an number average molecular weight of 6000) |
| E8000 | Pluriol ® E8000 (Polyethylene glycol with an number average molecular weight of 8000) |
| eG | ethoxylated glycerol with an average molecular weight of 310 g/mol |
| eTMP | ethoxylated trimethylolpropane with an number average molecular weight of 670 g/mol |

Example 1

In a first step, 100 parts by weight of the melamine-formaldehyde precondensate, MF, 38 parts of water, 1.2 parts of anionic surfactant aS, 0.3 parts of non-ionic surfactant nS, 2.5 parts of sodium formate, 3.0 parts of formic acid, 0.5 parts of polyethylene glycol Pluriol® E4000 and 18 parts of the pentane were mixed with one another at a temperature of 20 to 35° C. The mixture was introduced into a foaming mold of polypropylene and irradiated in a microwave oven with microwave. The foam bodies obtained after microwave irradiation were annealed in a circulating air oven at 200° C. for 20 min.

Example 2

Example 1 was repeated with the difference that 1.0 parts Pluriol® E 4000 were used.

Examples 3 to 5

Example 1 was repeated with the difference that 0.5 parts Pluriol® E 6000, E8000 and E1000 were used.

Example 6

Example 1 was repeated with the difference that 20 parts pentane were used.

Example 7

Example 1 was repeated with the difference that 0.5 parts ethoxylated glycerol were used.

Example 8

Example 1 was repeated with the difference that 0.5 parts ethoxylated trimethylolpropane were used.

Comparative Examples C1 and C2

Example 1 was repeated with the difference that no polyethylenglycol was added and 18 parts (C1) and 16 parts (C2) pentane were added.

Density and mechanical data (ram pressure, compression sets C0.5 and C24, compression strength) of the foams are summarized in Table 1. All data are the average of 3 measurements.

Comparative Examples C3, C4 and C5

Aqueous solutions of Pluriol E4000 are prepared by dissolving the PEG in deionized water under magnetic stirring to yield a concentration of 1% wt.

Melamine-formaldehyde foam samples cut to dimensions of 122×67×30 mm$^3$ are soaked with the solution in an aluminum tray and pressed out by hand three times to remove excess water.

Afterwards the samples are dried for 6 h in an oven at 70° C. till they reach constant weight. The weight of the samples after drying compared to the dry mass before impregnation allows to calculate the loading of the foams with PEG.

The samples are rinsed by putting them in an aluminum tray filled with 250 ml of deionized water at room temperature where they are allowed to soak and are afterwards pressed out by hand three times. Afterwards the foams are flipped over and the procedure is repeated.

The washing water was analyzed for its concentration of PEG.

TABLE 1

Type and amount of polymeric additive added per 100 parts of melamine-formaldehyde precondensate and physical and mechanical properties of the foams of Examples 1 to 7 and comparative Examples C1 to C3

| Example | C1 | C2 | 1 | 2 | 3 | 4 | 5 | 6 | 7 | 8 |
|---|---|---|---|---|---|---|---|---|---|---|
| Type of additive | — | — | E4000 | E4000 | E6000 | E8000 | E1000 | E4000 | eG | eTMP |
| parts of additive added | — | — | 0.5 | 1 | 0.5 | 0.5 | 0.5 | 0.5 | 0.5 | 0.5 |
| Density, g/L | 9 | 11 | 9 | 8 | 9 | 8 | 9 | 11 | 8 | 8 |
| Ram pressure, N | 34 | 20 | 44 | 39 | 39 | 34 | 36 | 32 | 49 | 41 |
| Compression set C0.5, % | 75 | 82 | 58 | 73 | 70 | 73 | 73 | 68 | 78 | 80 |
| Compression set C24, % | 35 | 41 | 17 | 32 | 31 | 33 | 35 | 30 | 40 | 40 |

TABLE 2

Concentration of PEG found in the washing water after soaking in water

| Example | 1 | C3 |
|---|---|---|
| Sample | Foamed with 0.5 parts Pluriol ® 4000 | Impregnated with 1% aqueous solution of Pluriol ® 4000 |
| mg/ml Pluriol ® | 0 | 0.5 |

A piece of melamine-formaldehyde foam comprising linear polymer according to present invention is used to clean a hard surface by wetting a piece of said foam with water and thereafter bringing it into contact with the hard surface to be cleaned. The foam according the present invention shows an excellent performance in removing greasy soap scum and neat kitchen dirt from said hard surface, whilst providing surface safety.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A cleaning implement comprising a foam, the foam comprising a crosslinked mixture of melamine-formaldehyde and from about 0.1 to about 5 weight % of at least one linear polymer with a number average molecular weight $M_n$ in the range from 500 to 10,000 g/mol, wherein the foam has a compression deflection force above 3.25 psi, and the cleaning implement is obtained by foaming and crosslinking a mixture of a melamine-formaldehyde precondensate and the linear polymer.

2. The cleaning implement according to claim 1, wherein the foam has a compression deflection force above 3.75 psi.

3. The cleaning implement according to claim 1, wherein the foam has a compression deflection force above 4.25 psi.

4. The cleaning implement according to claim 1, wherein the foam has a density in the range from about 8 to about 12 kg/m$^3$.

5. The cleaning implement according to claim 1, wherein the foam has a compression set after 24 hours below about 25%.

6. The cleaning implement according to claim 1, wherein the foam has a Ram Pressure above about 35 N.

7. The cleaning implement according to claim 1, wherein the foam comprises a linear polymer having a number average molecular weight $M_n$ in the range from 3,000 to 5,000 g/mol.

8. The cleaning implement according to claim 7, wherein the foam comprises from about 0.1 to about 1.5 weight % of the linear polymer.

9. The cleaning implement according to claim 7, wherein the linear polymer is polyethylene glycol.

10. The cleaning implement according to claim 1, wherein the foam is formed by the process of heating and foaming an aqueous mixture M using microwave radiation, said mixture M comprising at least one melamine-formaldehyde precondensate, at least one curative, at least one surfactant, at least one blowing agent and at least one linear polymer.

11. The cleaning implement according to claim 10, wherein said mixture M comprises a surfactant mixture comprising a mixture of 50 to 90 wt % of an anionic surfactant and 10 to 50 wt % of nonionic surfactants, wherein the weight percentages are each based on the total weight of the surfactant mixture.

12. The cleaning implement according to claim 10, wherein the curative is formic acid.

13. The cleaning implement according to claim 10, wherein the blowing agent is pentane.

14. The cleaning implement according to claim 1, wherein the foam has a Cumulative Pore Volume D90/D10 ratio above 1.65.

15. The cleaning implement according to claim 1, wherein the foam has a Cumulative Pore Volume D90/D10 ratio above 1.7.

16. The cleaning implement according to claim 1, wherein the foam has a Cumulative Pore Volume D90/D10 ratio above 1.8.

17. A process of producing the cleaning implement according to claim 10, comprising the steps of:
    a) producing an aqueous mixture M comprising
        100 parts by weight of the melamine-formaldehyde precondensate,
        2 to 4 parts by weight of the curative,
        0.2 to 5 parts by weight of a surfactant mixture,
        0.1 to 5 parts by weight of at least one salt of an inorganic acid and/or of an organic carboxylic acid,
        1 to 40 parts by weight of the blowing agent,
        0.1 to 5 parts by weight of the at least one linear polymer,
        0 to 20 parts by weight of one or more further additives, and
        25 to 60 parts by weight of water,
    b) heating and foaming said mixture M using microwave radiation,
    c) annealing the foam using hot air and/or nitrogen in a temperature range from 150° C. to 290° C.

18. The cleaning implement according to claim 1, wherein the foam comprises a benefit agent selected from the group consisting of a detergent composition; a surfactant; a dye; an ink; a pigment; scents; an acid; a base; an oil; a salt; bleach; an antimicrobial agent; a fragrance; a solvent; a biocide; a hydrophobicizing agent; an agent influencing haptics; an agent influencing soil release behavior; a formaldehyde scavenger; an abrasive, and combinations thereof.

19. A method of cleaning a hard surface comprising bringing the cleaning implement according to claim 1 into contact with a hard surface.

20. The cleaning implement according to claim 1,
    wherein the at least one linear polymer is selected from the group consisting of polyethylene glycol, ethoxylated glycerol, and ethoxylated trimethylolpropane;
    wherein the linear polymer has a number average molecular weight $M_n$ in the range from 3,000 to 5,000 g/mol;
    wherein the foam comprises from about 0.1 to about 1.5 weight % of the linear polymer; and
    wherein the foam is formed by the process of heating and foaming an aqueous mixture M using microwave radiation, said mixture M comprising at least one melamine-formaldehyde precondensate, at least one curative, at least one surfactant, at least one blowing agent and the at least one linear polymer.

* * * * *